United States Patent
Bhatoolaul et al.

(10) Patent No.: US 6,944,456 B1
(45) Date of Patent: Sep. 13, 2005

(54) MESSAGE ACCESS FOR RADIO TELECOMMUNICATIONS SYSTEM

(75) Inventors: David Lahiri Bhatoolaul, Grange Park (GB); Qiang Cao, Swindon (GB); Seau Sian Lim, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/936,038

(22) PCT Filed: Dec. 10, 1999

(86) PCT No.: PCT/GB99/04166

§ 371 (c)(1),
(2), (4) Date: Sep. 7, 2001

(87) PCT Pub. No.: WO00/56106

PCT Pub. Date: Sep. 21, 2000

(30) Foreign Application Priority Data

Mar. 18, 1999 (GB) .................................. 9906198

(51) Int. Cl.⁷ .............................. H04B 1/00; H04B 7/00
(52) U.S. Cl. ........................ 455/450; 455/60; 455/70; 455/522; 455/513; 455/422; 455/453; 455/69; 455/343; 455/562
(58) Field of Search ........................... 455/69, 70, 450, 455/522, 513, 422, 453, 60, 562

(56) References Cited

U.S. PATENT DOCUMENTS

| | | | |
|---|---|---|---|
| 5,933,781 A * | 8/1999 | Willenegger et al. | ........ 455/522 |
| 6,208,873 B1 * | 3/2001 | Black et al. | ................. 455/522 |
| 6,292,471 B1 * | 9/2001 | Cao et al. | .................... 370/252 |
| 6,587,672 B1 * | 7/2003 | Chuah et al. | .................. 455/69 |
| 6,628,956 B2 * | 9/2003 | Bark et al. | ................... 455/522 |

FOREIGN PATENT DOCUMENTS

| WO | WO 97/46033 | 12/1997 | ............ H04Q 7/12 |
|---|---|---|---|
| WO | WO 98/18280 | 4/1998 | ............ H04Q 7/38 |

* cited by examiner

Primary Examiner—Allan Hoosain

(57) ABSTRACT

In a UMTS system, the AICH is arranged to send, in addition to signals acknowledging that a preamble (164) from a mobile (12) is at an acceptable strength, further signals (171, 176) acknowledging message signals (168, 178) from the mobile. Preferably the further signal (171) is a negative acknowledgement signal, indicating that a message (168) is corrupted. Application of the invention avoids the involvement of layer (2) in message acknowledgement.

3 Claims, 4 Drawing Sheets

MESSAGE ACCESS FOR RADIO TELECOMMUNICATIONS SYSTEM

This invention relates to an improved message access arrangement for a radio telecommunications system such as Universal Mobile Telecommunications System (UMTS) and relates especially to message acquisition indications.

To make a connection to the UMTS system, in known arrangements a mobile. telephone sends its preamble at a first power, and waits for an acquisition indication on the Acquisition Indication Channel (AICH); if no indication is received, the preamble is resent at increased power, in steps, until an indication is received on the AICH. The message is then sent and if no positive acknowledgement is received via the Forward Access Channel (FACH), the message is assumed to be corrupted and it is resent. The total time spent by the mobile in waiting for acknowledgements can be considerable.

Further, checking of received preamble and message involves the Physical Layer (layer 1) and the Data Link Layer (layer 2) of the node (?) handling the connection; layer 2 may be located in the Base Transceiver Station (BTS) but it may alternatively be located in the Base Station Controller (BSC); the total time required for the messages to pass can add to the waiting time.

In WO 98/18280 Ericsson there is disclosure of a mobile station transmitting a random access request frame, which includes an error deduction redundancy field, but there is no specification as to when and to where the result of the error detection field test is sent.

It is an object of the invention to provide an arrangement in which the waiting time which a mobile may experience before its call is successfully connected is reduced.

According to the invention, a radio mobile telecommunications system comprising a base transceiver station arranged to manage a plurality of mobile systems within at least one telecommunications cell; the base station having means to provide an acquisition indication channel by which preamble signals sent by a mobile system to the base transceiver station are acknowledged when the strength of a preamble signal reaches a predetermined level, characterised in that the acquisition indication channel is further arranged to acknowledge message signals sent by said mobile system.

In the accompanying drawings, the prior art is illustrated in FIGS. 1–7 in which:—

The invention will be described with reference to FIGS. 8 and 9 in which:—

Figure 8:
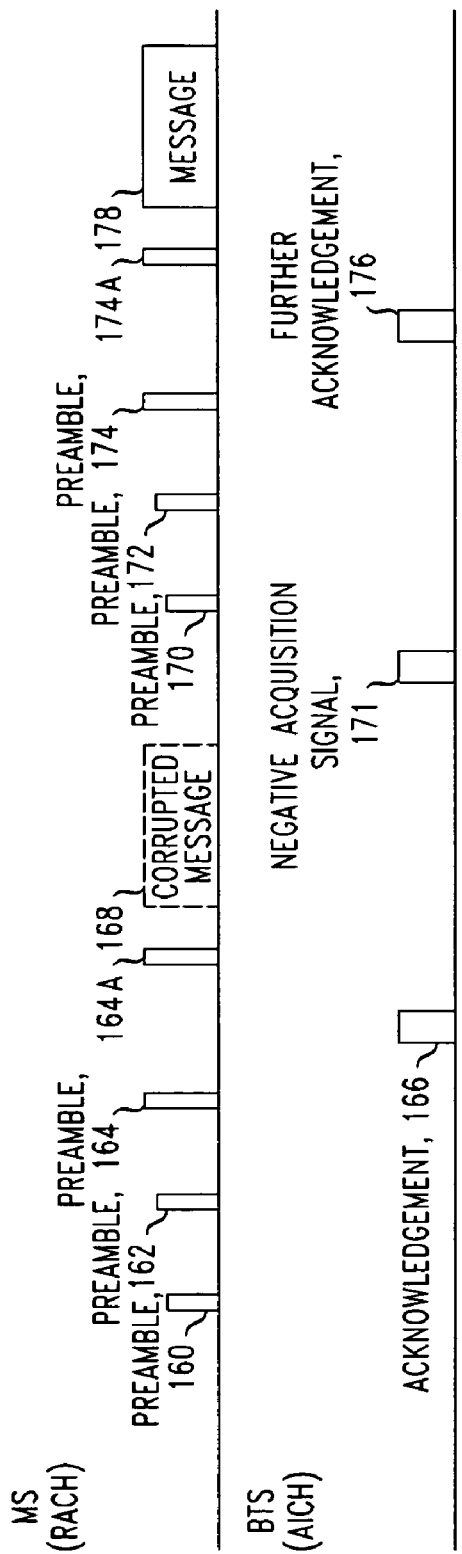
Figure 9:
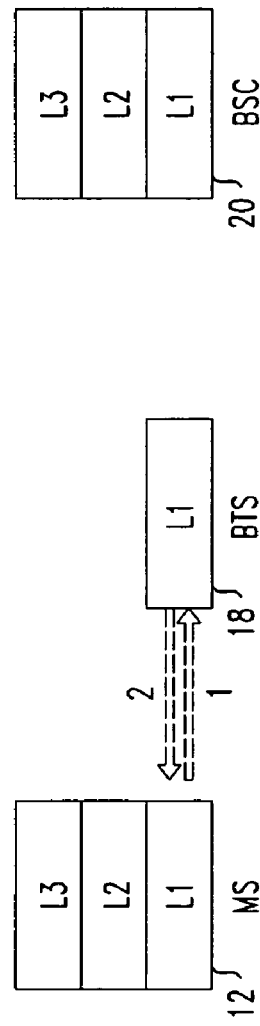

FIG. 8 illustrates how the random access and acquisition indication channels interact to acknowledge preamble and message signals from a mobile; and FIG. 9 illustrates the new message route.

Figure 1:
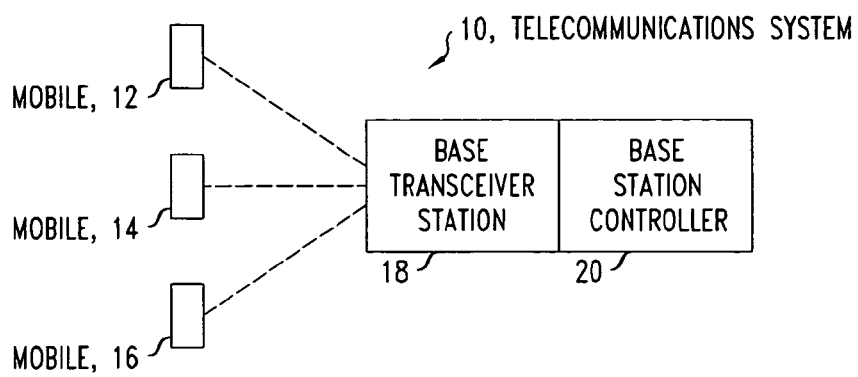
FIG. 1 is a schematic diagram of a part of a radio telecommunications system.

In FIG. 1, a part 10 of the UMTS is illustrated, comprising a plurality of mobile systems (MS) 12, 14, 16 associated with a telecommunications cell controlled by a Base Transceiver Station (BTS) 18 having a Base Station Controller (BSC) 20.

Figure 2:
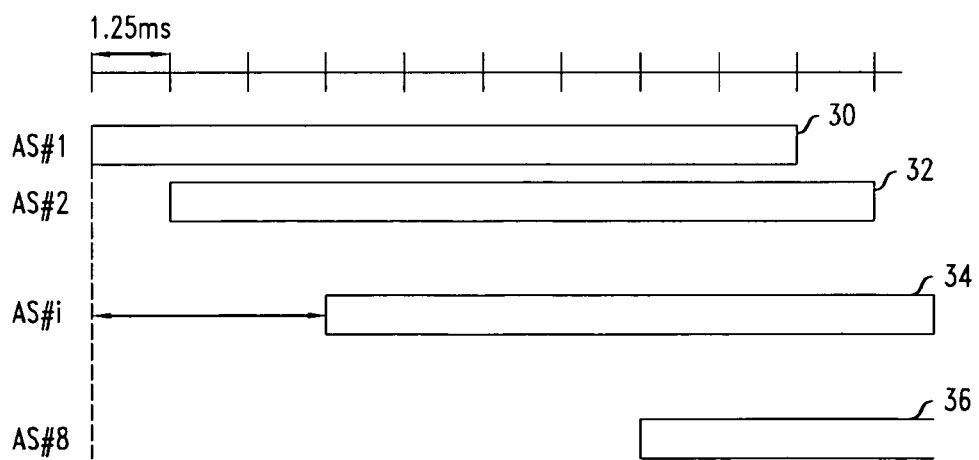
FIG. 2 illustrates a physical random access channel slots structure.

When a mobile such as 12 wishes to make a call, it utilises the Random Access Channel (RACH) of the UMTS which is mapped to the Physical Random Access Channel (PRACH). Transmission in this transport channel is based on the well known slotted Aloha approach, that is, a mobile can start a transmission of the PRACH at any one of a number of well defined time offsets, denoted access slots AS and illustrated in FIG. 2. The slots are spaced 1.25 milliseconds apart. Several of the slots in FIG. 2 are shown as filled by random access transmissions 30, 32, 34, 36.

Figure 3:
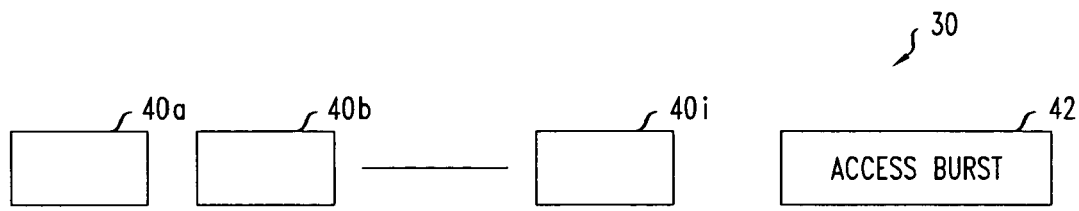
FIG. 3 illustrates the structure of a random access transmission.

FIG. 3 illustrates the structure of a Random Access Transmission such as transmission 30; there are several preamble parts 40*a*. 40*b*. 40*i*, each of length 1 millisecond, and an access burst 42 which contains the preamble part, plus a message part of length 10 milliseconds.

Figure 4:
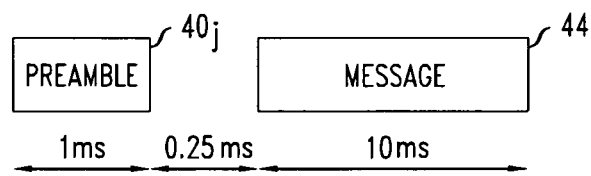
FIG. 4 illustrates the structure of an access burst from a mobile.

FIG. 4 shows the structure of the access burst 42. Between a preamble 40*j* and the message part 44 there is an idle time period of length 0.25 milliseconds. This idle period allows for detection of the preamble part and subsequent online processing of the message part.

Figure 5:
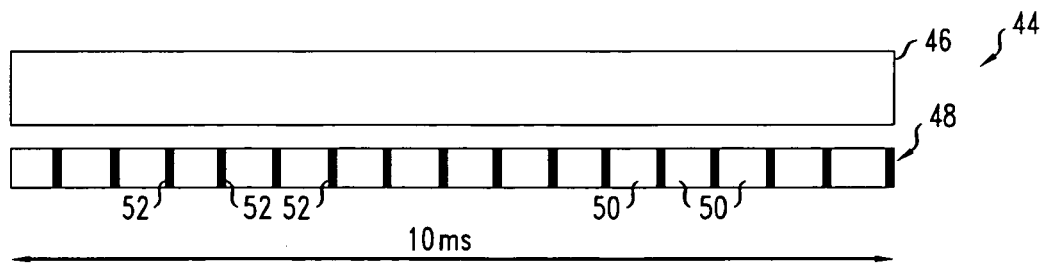
FIG. 5 illustrates the message part of the random access burst.

FIG. 5 shows that the RACH message part 44 consists of a data part 46, corresponding to the uplink Dedicated Physical Data Channel (DPDCH) and a layer 1 control part 48, corresponding to the uplink Dedicated Physical Control Channel (DPCCH). The data and control parts 46, 48 are transmitted in parallel.

The data part 46 carries layer 2/layer 3 messages requesting radio resources or a user packet. The spreading factor of the data part is limited to $SF_e\{256, 128, 64, 32\}$ corresponding to channel bit rates of 16, 32, 64 and 128 Kbps respectively. The control part 48 carries pilot bits 50 and rate information 52, using a spreading factor of 256. The rate information indicates a spreading factor of the channelisation code which is used on the data part.

For RACH transmission, the technique of preamble power ramping is used, and the procedure used by a random request has the following actions:

1. After cell search and synchronisation, the mobile 12 reads the Broadcast Control Channel (BCCH) (not illustrated) to get information about
   i the preamble spreading code(s)
   ii the available signatures
   iii the available access slots
   iv the available spreading factors for the message part
   v the uplink interference level in the cell
   vi the primary CCPCH (Common Control Physical Channel) transmit power level
2. The MS selects a preamble spreading code and thus the message scrambling code.
3. The MS selects a preamble signature and uses it to determine the primary node of the channelisation codes used by the message part of the access burst.
4. The MS selects a channelisation code (corresponding to a spreading factor) for the message part.
5. The MS estimates the downlink path loss (by using information about the transmitted and received power level of the primary CCPCH), and determines the required uplink transmit power (by using information about the uplink interference level in the cell).
6. The MS implements the dynamic persistence algorithm by:

Reading the current dynamic persistence value from the BCH.

Performing a random draw against the current dynamic persistence value.

Deferring transmission for one frame and repeating step 6 if the result of the random draw is negative, otherwise proceeding to step 7.

7. The MS randomly selects an access slot from the available access slots.
8. The MS transmits its preamble at a negative power offset relative to the estimated uplink transmit power. This is illustrated at reference 60 in FIG. 7.
9. The MS waits for an acquisition indication (on the AICH) from the network side. If none is received within a predefined time-out period, the MS transmits the preamble again but with a smaller power offset and a re-selected preamble signature, reference 62, showing the higher power.
10. Step 8 is repeated, reference 64, showing a further increase in power, and an acquisition indicator 66 is received from the network side that indicates the acceptance by the network side of the preamble at that power offset. The acquisition indicator 66 is received on the AICH.
11. If an acquisition indicator is received on the AICH in Step 9, the random access burst is transmitted in the next available access slot. This burst comprises a repeated preamble 64A and a message 68.
12. If the message 68 is corrupted, as indicated by the dotted lines, then there is no positive acknowledgement and actions 1 to 11 are repeated, references 70 to 78; message 78 is successfully received, and an acknowledgement 80 is sent from the network on FACH.

Figure 6:
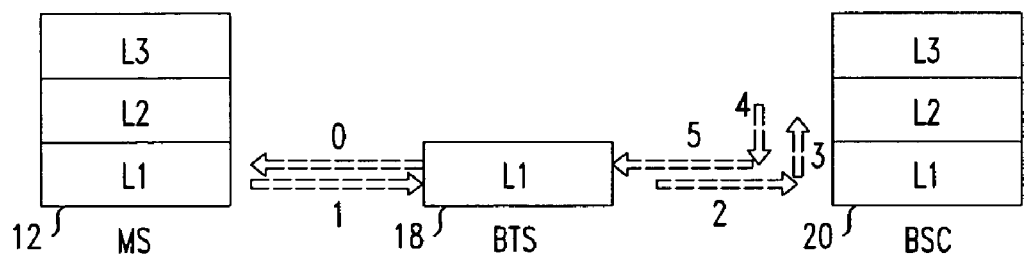
FIG. 6 illustrates the layers involved in message acknowledgement.

Referring again to FIG. 6, actions 1 to 12 involve the physical layer L1 of the MS 12, the physical layer L1 of the BTS 18, and the physical layer L1 and the Data Link Layer L2 of the BCS 20; a Cyclic Redundancy Code (CRC) check is applied by the BTS 18 in layer L1, but the outcome is sent to layer L2 of the BSC 20, which puts the positive acknowledgement 80 onto the FACH.

When the message is corrupt, 68, layer L2 of the BSC 20 does not send acknowledgement 80.

It is clear that the Waiting Time (WT) of the MS12 before successful connection can be long; this applies even when the message is not corrupted.

Figure 7:
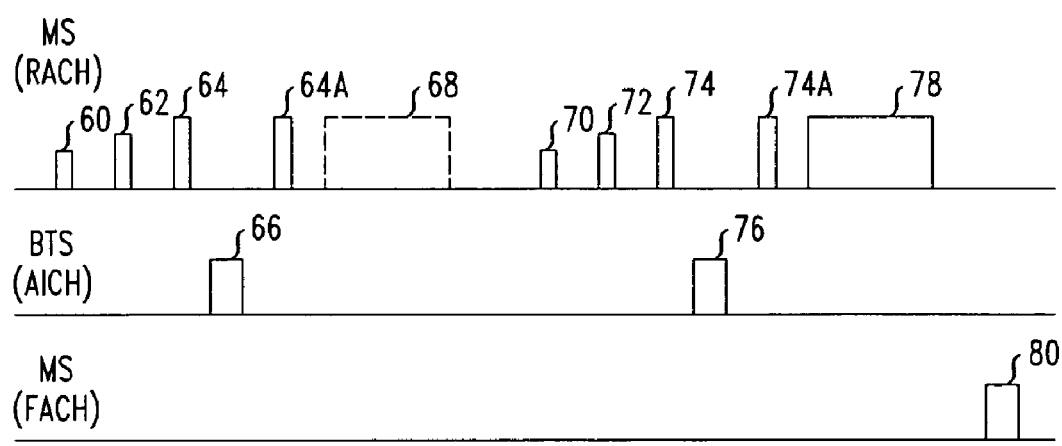
FIG. 7 illustrates how random access acquisition indication and forward access channels interact to acknowledge preamble and message signals from a mobile.

Turning now to the invention, FIG. 8 shows similar integers to FIG. 7, advanced by 100, and actions 1 to 11 occur as in the prior art, integers 160 to 168. However, when the corrupted message 168 is received, a negative acknowledgement 171 is sent to the MS12 by the BTS 18, and actions 5 to 11 are repeated. If there is no negative acknowledgement 171, the MS 12 assumes that the RACH transmission has been successful.

FIG. 9 illustrates that, with application of the invention, the longer route to the BSC 20 and its layer L2 is no longer involved, and thus considerable time is saved.

Further, since a negative acknowledgement message 171 is sent only in the relatively rare case of a corrupted message, traffic volume over the air interface is reduced. Also, sending the signal 171 avoids the time-out present in the prior art arrangement.

While the AICH could be arranged to send positive acknowledgement signals after CRC checking of a message, the advantage of a reduction in traffic volume would then not be achieved.

What is claimed is:

1. A radio mobile telecommunications system comprising a base transceiver station arranged to manage a plurality of mobile systems within at least one telecommunications cell; the base station having means to provide an acquisition indication channel by which preamble signals sent by a mobile system to the base station are acknowledged when the strength of a preamble signal reaches a predetermined level, a message thereafter being sent to the mobile system, wherein the base transceiver station is further arranged to send a negative acquisition signal if the message sent by the mobile system is unacceptable but not a positive acquisition signal if the message sent by the mobile is acceptable.

2. A system according to claim 1 in which a negative acquisition signal is sent when the message sent by the mobile system fails a cyclic redundancy code check performed in the base transceiver station.

3. A method of operating a radio base transceiver station comprising:

receiving spaced preambles of increasing strength from a mobile station;

sending a preamble acknowledgement signal on an acquisition indication channel when a preamble reaches an acceptable strength;

thereafter receiving a message signal from the mobile system upon receipt of the message, if the message is corrupted sending a negative acknowledgement signal on said acquisition indication channel from the base transceiver station to the mobile system indicating the message is corrupted but if the message is acceptable not sending a positive acknowledgement signal indicating successful receipt of the message.

* * * * *